May 12, 1959   J. JERGER, JR   2,886,495
GLASS-DISTILLATION DEVICE
Filed June 11, 1954

INVENTOR.
JOSEPH JERGER, JR.
BY
*Mitchell & Bechert*
ATTORNEYS

United States Patent Office 2,886,495
Patented May 12, 1959

2,886,495
GLASS-DISTILLATION DEVICE

Joseph Jerger, Jr., New Hyde Park, N.Y., assignor to Servo Corporation of America, New Hyde Park, N.Y., a corporation of New York Application June 11, 1954, Serial No. 436,034

3 Claims. (Cl. 202—201)

My invention relates to glass-distillation equipment as of the type generally described in copending Jerger et al. application, Serial No. 330,702, filed January 12, 1953.

It is an object of the invention to provide improved apparatus of the character indicated.

It is a specific object to provide means for promoting an accelerated rate of glass production with equipment of the character indicated.

Figure 1:
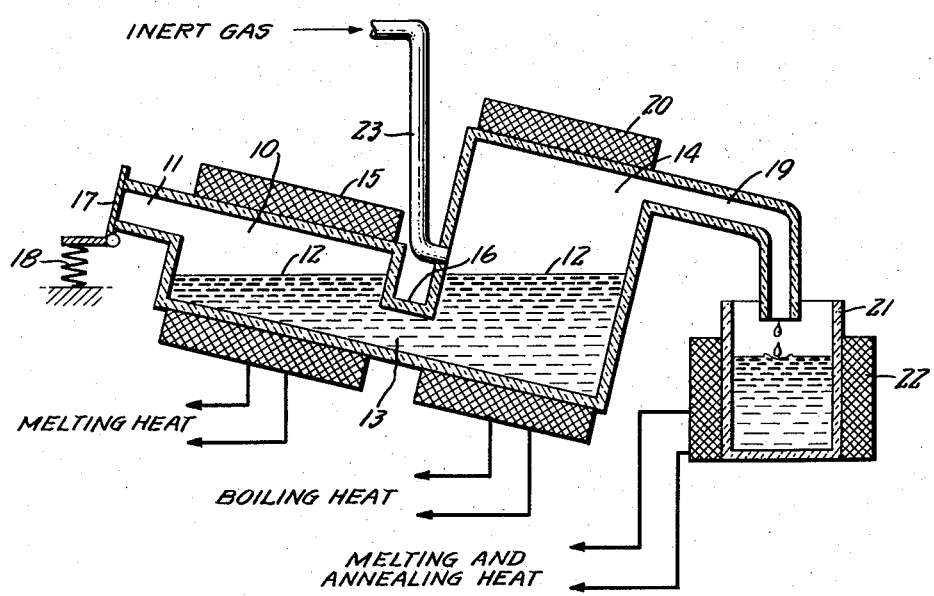
Figure 2:
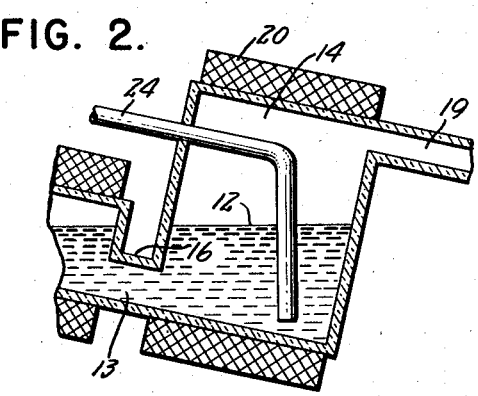

Other objects and various further features of novelty and invention will be pointed out or will occur to those skilled in the art from a reading of the following specification in conjunction with the accompanying drawings. In said drawings, which show for illustrative purposes only, preferred forms of the invention:

Fig. 1 is a simplified longitudinal sectional view of glass-distillation equipment incorporating features of the invention; and Fig. 2 is a similar but fragmentary view to illustrate a modification.

Briefly, my invention contemplates accelerating the rate of glass distillation by supplying to a boiling or distillation chamber a pressurized flow of inert gas to aspirate vaporized glass in the direction of the discharge or distillation outlet, so that distillation may assuredly take place substantially only through said outlet. Since the inert gas is supplied in such manner that it may flow only out the discharge outlet, back distillation and other non-utilizable distillation is avoided.

My invention is particularly applicable to the purification of glasses having essentially a single boiling point or boiling range. These glasses may include arsenic trisulfide, as well as various mixtures of arsenic, sulfur, selenium and tellurium, as disclosed more fully in copending Fraser application, Serial No. 372,540, filed November 5, 1954, now abandoned, and in my copending application Serial No. 417,724, filed March 22, 1954. The invention is also applicable to the purification of certain raw-material components for such glasses, as, for example, arsenic disulfide used in the manner described in my copending application Serial No. 430,394, filed May 17, 1954. It will, therefore, be understood that references herein to the distillation of glass contemplate equally well the distillation of glass as the direct end product, or the distillation of an important glass raw material, such as arsenic disulfide.

Referring to Fig. 1 of the drawings, my invention is shown in application to glass-distillation equipment comprising a first or melting chamber 10, having a loading end 11 above the intended fluid level 12 and provided at the other end with fluid-communicating means 13 to supply melted glass or raw material to a boiling or distillation chamber 14. Heating means, such as an electrical coil 15, may envelop the melting chamber 10 and may be adjusted to heat (sufficient to melt, but not to boil) the contents of chamber 10.

The nature of means 13 connecting the two chambers is preferably such as to define a dam 16 or other means effectively closing off the gas volumes above the fluid level in both chambers. Back flow of gas or vapor may be further reduced by removable closure means 17 over the supply inlet 11 to the melting chamber 10; spring 18 is shown continuously urging the closure of means 17. The distillation chamber 14 may include a distillation-exhaust outlet 19 communicating with an upper part of chamber 14 and preferably remote from the connection 13 to the melting chamber. Heating means 20 for the distillation chamber 14 may resemble that described for chamber 10, except, of course, that the heating energy supplied is at or above the boiling point of the melted glass. In the case of arsenic disulfide, this will mean operation at or just above 565° C.

In operation, the dam 16 will serve to avoid any inadvertent back-distillation into chamber 10 and, depending upon the heat supplied at 20, a certain amount of glass will be distilled and may be collected in a receiver 21, heated, if desired, by means 22 until a suitable batch has been accumulated, after which the accumulated batch may be heat-treated, as necessary to produce homogeneous, strain-free glass. However, in accordance with the invention, I substantially accelerate this process by providing an inert-gas supply means 23 communicating directly with the chamber 14. In Fig. 1, the point of connection of means 23 is remote from the discharge outlet 19 and is above the fluid level 12 in the apparatus.

In spite of the dam 16 and without the inert-gas supply 23, there is a normal tendency of the vaporized glass to condense prematurely within chamber 14, as along unheated walls, no matter how well the walls may be insulated. However, the flow of gas through means 23 has been found effectively to aspirate the glass vapors, so that substantially all the distillation takes place through the outlet 19, and a maximum rate of glass production is achieved. The inert gases are preferably either nitrogen or helium, and, therefore, by the word "inert" I mean merely that, by reason of the supply of such gas, there shall be no contaminating or undesirable reaction with the glass vapors or with the distillate accumulation.

In Fig. 2, I show a slight modification in which the inert-gas supply 24 extends well within the distillation chamber 14 and below the surface 12 of the liquid glass. The inert gas is then caused to bubble through the liquid, and I find that distillation is thereby also enhanced.

It will be seen that I have described a relatively simple construction for promoting increased production of distillable glasses and raw materials. This increased production is achieved without waste of glass components and without introducing any impurity into the distilled product.

While I have described the invention in detail for the preferred forms shown, it will be understood that modifications may be made within the scope of the invention as defined in the claims which follow.

I claim:

1. A glass-distillation apparatus comprising a unitary structure having an enclosed melting chamber and a distillation chamber following said melting chamber, a fluid-communicating means integral with and between said melting and said distillation chambers, a downwardly extending dam associated with said fluid-communicating means adapted to extend below the fluid levels of both chambers whereby to prevent the backward flow of vapor from said distillation chamber to said melting chamber, heating means for said apparatus comprising an electric coil enveloping said melting chamber and an electirc coil enveloping said distillation chamber, a distillation exhaust extension communicating with and extending from an upper portion of said distillation chamber above the liquid level thereof remote from the fluid-communicating means between said chambers, aspirating means associated with said distillation chamber for supplying inert gas under pressure to said chamber so that vapors formed therein are directed into said exhaust extension for condensation therein and a receiver associated with said exhaust extension for collecting the condensed vapors discharging therefrom.

2. The apparatus according to claim 1 wherein said aspirating means discharges said inert gas above the fluid level in said distillation chamber.

3. The apparatus according to claim 1 wherein said aspirating means discharges said inert gas on the side of said distillation chamber remote from said discharge outlet.

References Cited in the file of this patent

UNITED STATES PATENTS

| | | |
|---|---|---|
| 875,381 | Rice | Dec. 31, 1907 |
| 994,022 | McNitt | May 30, 1911 |
| 1,184,359 | Liese | May 23, 1916 |
| 1,598,308 | Pike | Aug. 31, 1926 |
| 1,873,774 | Listrat | Aug. 23, 1932 |
| 1,880,541 | Wadman | Oct. 4, 1932 |
| 2,255,549 | Kruh | Sept. 9, 1941 |
| 2,413,037 | De Voe | Dec. 24, 1946 |
| 2,607,675 | Gross | Aug. 19, 1952 |
| 2,615,706 | Davey | Oct. 28, 1952 |
| 2,622,019 | Scheuer | Dec. 16, 1952 |
| 2,691,689 | Arbeif et al. | Oct. 12, 1954 |

OTHER REFERENCES

National Bureau of Standards, Research Paper RP 871, "Distillation and Separation of Arsenic, Antimony and Tin," vol. 16, Journal of Research of N.B.S. March 1936, pages 253–259, incl. (Copy in Scientific Lib.)

"Handbook of Glass Manufacture," by Tooley, 1953, Ogden Pub. Co. (Copy in Div. 15.)

"Textbook of Inorganic Chemistry," vol. VI, part IV, "Arsenic," by R. H. Vallance, London, Chas. Griffin & Co. Ltd., 1938.